United States Patent
Motta et al.

(10) Patent No.: US 9,681,096 B1
(45) Date of Patent: Jun. 13, 2017

(54) LIGHT FIELD CAPTURE

(71) Applicant: Apple Inc., Cupertino, CA (US)

(72) Inventors: Ricardo J. Motta, Palo Alto, CA (US); Gary L. Vondran, Jr., Cupertino, CA (US); Manohar B. Srikanth, Mountain View, CA (US); Brett D. Miller, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/275,074

(22) Filed: Sep. 23, 2016

Related U.S. Application Data

(60) Provisional application No. 62/363,681, filed on Jul. 18, 2016.

(51) Int. Cl.
| | |
|---|---|
| *H04N 7/15* | (2006.01) |
| *H04N 7/14* | (2006.01) |
| *G06F 3/01* | (2006.01) |
| *H04N 5/247* | (2006.01) |
| *H04N 13/00* | (2006.01) |

(52) U.S. Cl.
CPC ............ *H04N 7/142* (2013.01); *G06F 3/012* (2013.01); *G06F 3/013* (2013.01); *H04N 5/247* (2013.01); *H04N 7/147* (2013.01); *H04N 7/15* (2013.01); *H04N 13/0007* (2013.01)

(58) Field of Classification Search
None
See application file for complete search history.

(56) References Cited

U.S. PATENT DOCUMENTS

| | | | | |
|---|---|---|---|---|
| 6,049,424 | A * | 4/2000 | Hamagishi | G02B 27/2214 345/419 |
| 6,239,830 | B1 * | 5/2001 | Perlin | G02B 27/0093 345/6 |
| 6,250,928 | B1 * | 6/2001 | Poggio | G09B 19/04 345/473 |
| 7,333,132 | B2 | 2/2008 | Shimizu | |
| 8,405,740 | B2 | 3/2013 | Nichols | |
| 9,377,863 | B2 * | 6/2016 | Bychkov | G06F 3/017 |

(Continued)

OTHER PUBLICATIONS

Yang, Zhenyu, "Multi-Stream Management for Supporting Multi-Party 3D Tele-Immersive Environments," Dissertation Submitted in partial fulfillment of the requirements for the degree of Doctor of Philosophy in Computer Science in the Graduate College of the University of Illinois at Urbana-Champaign, 2007.

*Primary Examiner* — Creighton Smith
(74) *Attorney, Agent, or Firm* — Blank Rome LLP

(57) ABSTRACT

This disclosure pertains to operations, systems, and computer readable media to capture images of a scene using a camera array and process the captured images based on a viewer's point of view (POV) for immersive augmented reality, live display wall, head mounted display, video conferencing, and similar applications. In one implementation, the disclosed subject matter provides a complete view to a viewer by combining images captured by a camera array. In another implementation, the disclosed subject matter tracks the viewer's POV as he moves from one location to another and displays images in accordance with his varying POV. The change of the viewer's POV is inclusive of movements in the X, Y, and Z dimensions.

20 Claims, 16 Drawing Sheets

(56) References Cited

U.S. PATENT DOCUMENTS

| | | | |
|---|---|---|---|
| 2009/0202114 A1* | 8/2009 | Morin | A63F 13/12 |
| | | | 382/118 |
| 2009/0219283 A1* | 9/2009 | Hendrickson | H04N 13/0022 |
| | | | 345/420 |
| 2012/0169882 A1* | 7/2012 | Millar | H04N 7/181 |
| | | | 348/159 |
| 2013/0069933 A1* | 3/2013 | Smithwick | G02B 27/2214 |
| | | | 345/419 |
| 2013/0335507 A1* | 12/2013 | Aarrestad | H04N 7/15 |
| | | | 348/14.08 |
| 2014/0002349 A1* | 1/2014 | Hansen | A61B 3/113 |
| | | | 345/156 |
| 2014/0002586 A1* | 1/2014 | Nourbakhsh | H04N 7/144 |
| | | | 348/14.16 |
| 2014/0285634 A1 | 9/2014 | Rhoads | |
| 2016/0027187 A1* | 1/2016 | Wang | G06T 7/73 |
| | | | 382/164 |
| 2016/0227201 A1* | 8/2016 | Ng | H04N 13/0447 |
| 2017/0011519 A1* | 1/2017 | Ohba | G06F 3/0346 |

\* cited by examiner

LIGHT FIELD CAPTURE

BACKGROUND

The use of immersive augmented reality, display wall, head mounted display, and video conference has increased in recent years. For example, a video conference is an online meeting that takes place between two or more parties, where each party can hear the voice and see the images of the other. In a video conference between two parties, each party participates through a terminal, e.g., a desktop computer system, a tablet computer system, TV screen, display wall, or a smart phone, at each site. A terminal typically comprises a microphone to capture audio, a webcam to capture images, a set of hardware and/or software to process captured audio and video signals, a network connection to transmit data between the parties, a speaker to play the voice, and a display to display the images. In such a traditional setup, a viewer could only see a fixed perspective of his counterparty and her scene. In particular, the viewer could only see what is captured by the counterparty's webcam. Further, as the viewer moves from one location to another during the conference, his point of view (POV) may change. However, due to limitations of the image capturing at the counterparty's site, the viewer could only see images from the same perspective all the time.

SUMMARY

This disclosure describes a technology that relates to, and may be used in, image capture and processing for immersive augmented reality, live display wall, head mounted display, and video conferencing applications. In one embodiment, the disclosed subject matter provides a complete view to a viewer by combining images captured by a camera array. In another embodiment, the disclosed subject matter tracks the viewer's point of view (POV) as he moves from one location to another and displays images in accordance with his varying POV. The change of the viewer's POV is inclusive of movements in, for example, the X, Y, and Z dimensions.

In accordance with one embodiment, for example, during a video conference, each party participates through a terminal. Each terminal comprises a display, a camera array, an image processing unit (e.g., including hardware and/or software), and a network connection (e.g., through cable and/or wireless connections). Each camera array may comprise a plurality of cameras. The camera array may capture images (e.g., color RGB, YUV, YCC, etc.). Also the camera array may either capture depth, capture information to compute depth (e.g., structured light, time of flight, stereo images, etc.), or compute depth from other means of each party, and meanwhile track this party's POV (e.g., represented by this party's head and/or eye positions). Data representative of a viewer's POV may be transmitted by the viewer's terminal and received by a speaker's terminal through the network connection. The image processing unit within the speaker's terminal may process the captured images of the speaker based on the viewer's POV. In particular, image processing operations may comprise a culling operation that trims pixels from the captured images based on the viewer's POV and identifies remaining pixels. The purpose of the culling operation is to reduce the amount of data for processing. Because the processed data will ultimately be transferred from one party to the other, culling reduces the amount of data for transferring, saves bandwidth, and reduces latency. After culling, the image processing unit may map the remaining pixels from individual cameras' three-dimensional (3-D) space to two-dimensional (2-D) display space. Next, data of the mapped pixels may be transmitted by the speaker's terminal and received by the viewer's terminal through the network connection. Subsequently, the image processing unit within the viewer's terminal may blend the mapped pixels and assemble an image ready for display (i.e., a "frame"). Separately, the speaker's POV may be used by the viewer's terminal to process captured images of the viewer. The image processing operations within the viewer's terminal may be a "mirror" process to those described within the speaker's terminal. As one with ordinary skill in the art should appreciate, the terms "speaker" and "viewer" are used here to facilitate an explanation of the disclosed concepts. In a video conference, each party behaves as both speaker and viewer with respect to his/her counterparty. Thus, the image capture and processing operations, described above at the viewer's and the speaker's sites, take place simultaneously and continuously within the terminal at each site. This provides each party a continuous display of frames (i.e., a live video) of his/her counterparty based on this party's POV. Further, the camera array may either stand-alone by itself or be integrated into the display at each site. For applications such as immersive augmented reality, live display wall, and head mounted display where there may be only one viewer all the time, the terminals may be asymmetric with a camera array only at the capture site to capture a scene to be viewed on the viewer's display, while there may be no camera array at the viewer's site. The viewer's POV may be tracked by one or more cameras or other devices, separate from a camera array, dedicated for tracking purposes, and the speaker's POV may not be tracked.

DETAILED DESCRIPTION

This disclosure pertains to operations, systems, and computer readable media to capture images of a scene using a camera array and process the captured images based on a viewer's point of view (POV) for immersive augmented reality, live display wall, head mounted display, and video conferencing applications. To simplify explanation and without introducing any limitation, this disclosure uses an exemplary video conference between two parties to illustrate disclosed concepts. The terms "camera", "image capture device," or "digital image capture device" used here are meant to mean any instrument capable of capturing digital images. In the following description, for purposes of explanation, numerous specific details are set forth in order to provide a thorough understanding of the inventive concept. As part of this description, some of this disclosure's drawings represent structures and devices in block diagram or flowchart form in order to avoid obscuring the disclosed subject matter. In the interest of clarity, not all features of an actual implementation may be described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment," "another embodiment," or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of image processing systems having the benefit of this disclosure.

Figure 1:
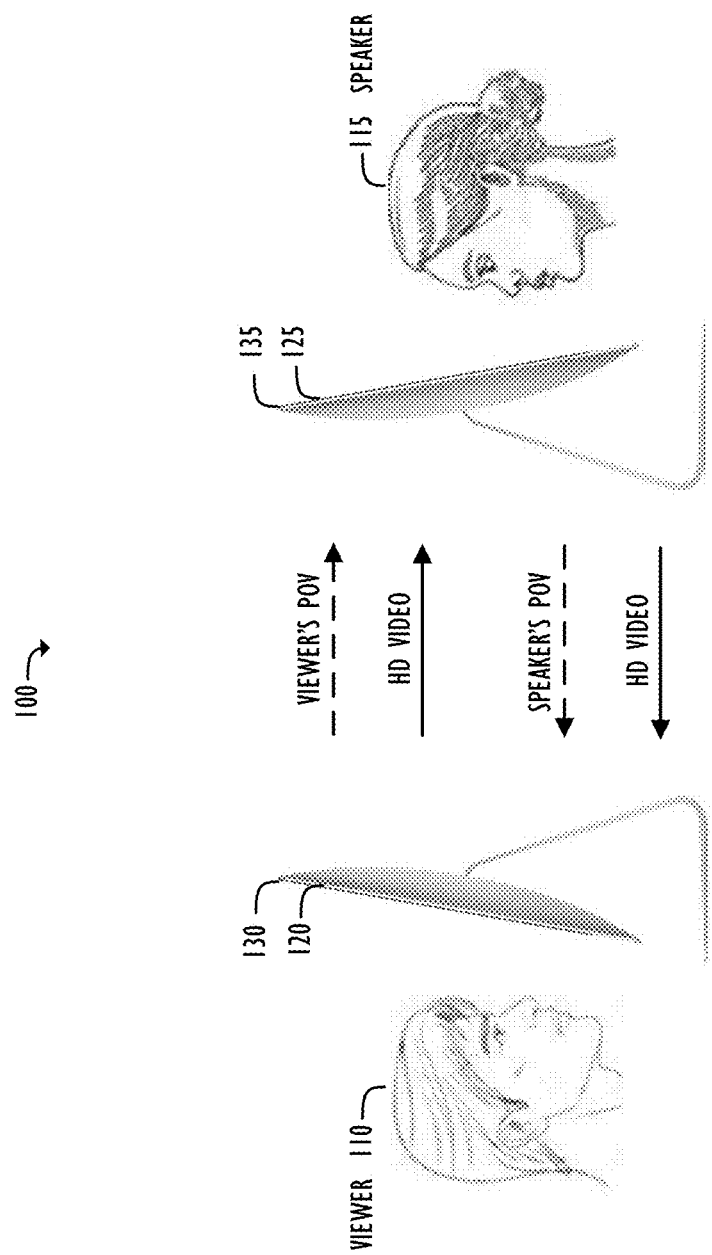
FIG. 1 illustrates data transmissions between two parties in accordance with one embodiment.

FIG. 1 illustrates data transmissions between two parties in an exemplary video conference 100 in accordance with one embodiment. In FIG. 1, two parties, 110 and 115, each participates in the conference through a terminal, e.g., a desktop computer system, a tablet computer system, a TV screen, a display wall, or a smart phone, at each site. Each terminal comprises a camera array, 120 and 125, and a display, 130 and 135, respectively. The camera array, 120 and 125, may be integrated into its corresponding display, 130 and 135, respectively. Each camera array may also be arranged in other manners, for example, standing-alone around the display's periphery or at its corners. At each site, each display and camera array pair provides at least three functionalities—(1) to capture images of a scene, including information to compute depth, (2) track the POV of the corresponding party (e.g., represented by the party's eye and/or head positions), and (3) to display images of his/her counterparty. For example, camera array 120 captures images (e.g., color RGB, YUV, YCC, etc.), including information to compute depth, and tracks the POV of viewer 110 (e.g., represented by his eye and/or head positions), while camera array 125 captures images, including information to compute depth, and tracks the POV of speaker 115 (e.g., represented by her eye and/or head positions). The camera arrays may capture other types of images, e.g., greyscale and/or color images only. Each party's POV may also be tracked by one or more cameras or other devices, separate from the camera arrays, dedicated for tracking purposes. Viewer 110's POV may be transmitted from his terminal to speaker 115's terminal, and vice versa, speaker 115's POV may be transmitted from her terminal to viewer 110's terminal, through a network connection between the two terminals. The network connection may be based on cable connections and/or wireless connections. Speaker 115's terminal may then process the captured images of speaker 115 based on viewer 110's POV, and viewer 110's terminal may process the captured images of viewer 110 based on speaker 115's POV. Processed data can then be transmitted from one party's terminal to his/her counterparty's terminal through their network connection. Finally, each terminal may receive the data, finish remaining image processing operations, and display frames on displays 130 and 135 for each party respectively.

Figure 2:
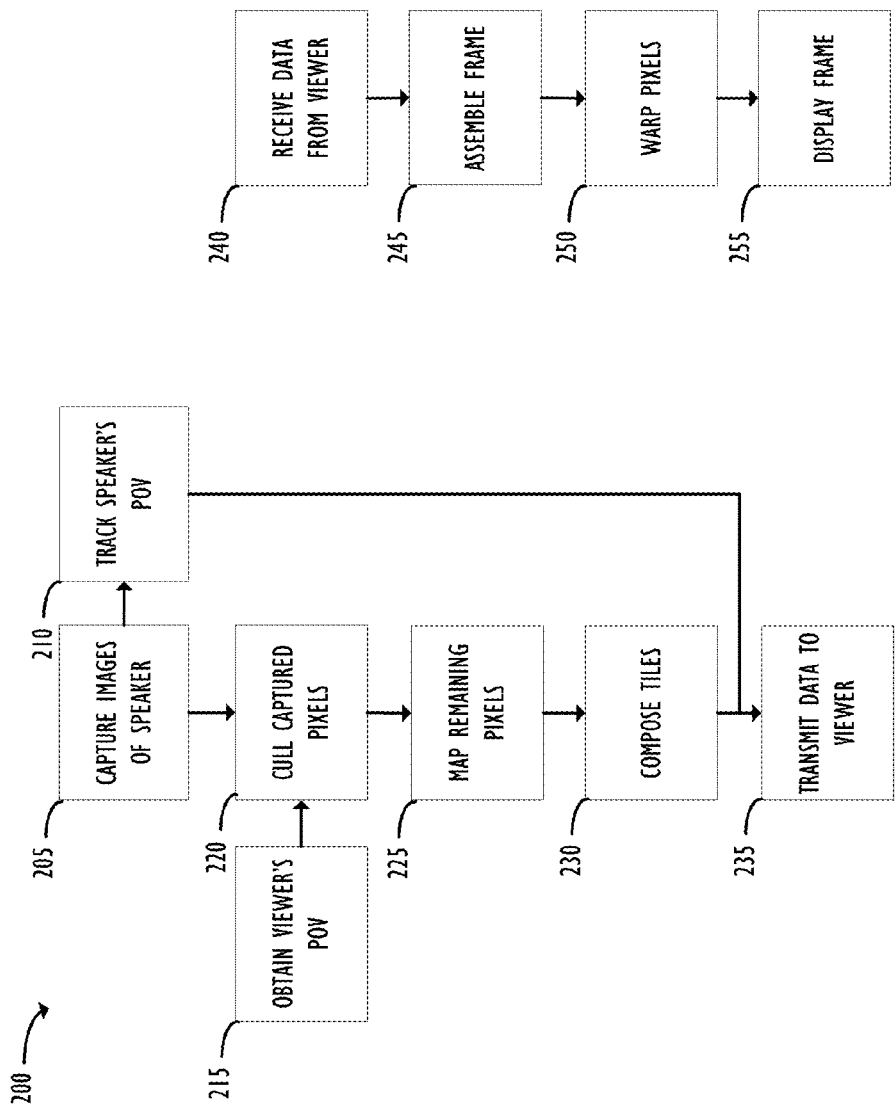
FIG. 2 illustrates a flowchart of a simplified image capture and processing operation in accordance with one embodiment.

FIG. 2 illustrates a flowchart of a simplified image capture and processing operation 200 in accordance with one embodiment. In operation 200, a first camera array captures images of a first scene (block 205), which may include a speaker, and the speaker's POV may be tracked (block 210). At the same time, the speaker's terminal may obtain data representative of a viewer's (i.e., his counterparty) POV (block 215). Next, operation 200 may trim (or cull) pixels from the captured images of the speaker based on the viewer's POV and identify remaining pixels (block 220). After culling, operation 200 may map the remaining pixels from individual cameras' 3-D space to 2-D display space (block 225). After mapping, operation 200 may blend the mapped pixels to compose tiles for display (block 230). The composed tiles may be transmitted to the viewer's terminal (block 235). The composed tiles may be assembled into a frame at viewer's terminal (not shown here). Separately, the speaker's terminal may also receive composed tiles from the viewer (block 240). The tiles may be assembled into a frame, representing the viewer's scene, by the speaker's terminal (block 245). A late warping operation may be applied to compensate for a change of the speaker's POV (note that the speaker now plays a role as a viewer), which may occur during the transmission of the composed tiles from the viewer to the speaker (block 250). Finally, the frame may be viewed on the speaker's display (block 255).

There may be variants about the data to be transmitted from one terminal to another. As described above, the speaker's terminal may transmit the composed tiles to the viewer's terminal, while the viewer's terminal may subsequently assemble the composed tiles into the frame (e.g., block 245 but at the viewer's terminal). In another embodiment, the speaker's terminal may transmit the mapped pixels to the viewer's terminal. Subsequently, the viewer's terminal may complete the rest of image operations, including tile composition and frame assembly (e.g., blocks 230 and 245 but at the viewer's terminal). In still another embodiment, the speaker's terminal may transmit the pixels of captured images to the viewer's terminal. Subsequently, the viewer's terminal may complete the other image operations (e.g., blocks 220-230 and 245 but at the viewer's terminal). In still another embodiment, the speaker's terminal may assemble the composed tiles into the frame (e.g., block 245 but at the speaker's terminal) and send the assembled frame to the viewer. Further, for applications such as immersive augmented reality, live display wall, and head mounted display, there may be only one viewer all the time. Alternatively, in some embodiments, the terminals may be asymmetric with a camera array only at the capture site to capture a scene to be viewed on the viewer's display, while there is no camera display at the viewer's site. The viewer's POV may be tracked by one or more cameras or other devices, separate from a camera array, dedicated for tracking purposes. Also, operation 200 may not require tracking of the speaker's POV (or block 210 may be removed).

Figure 3:
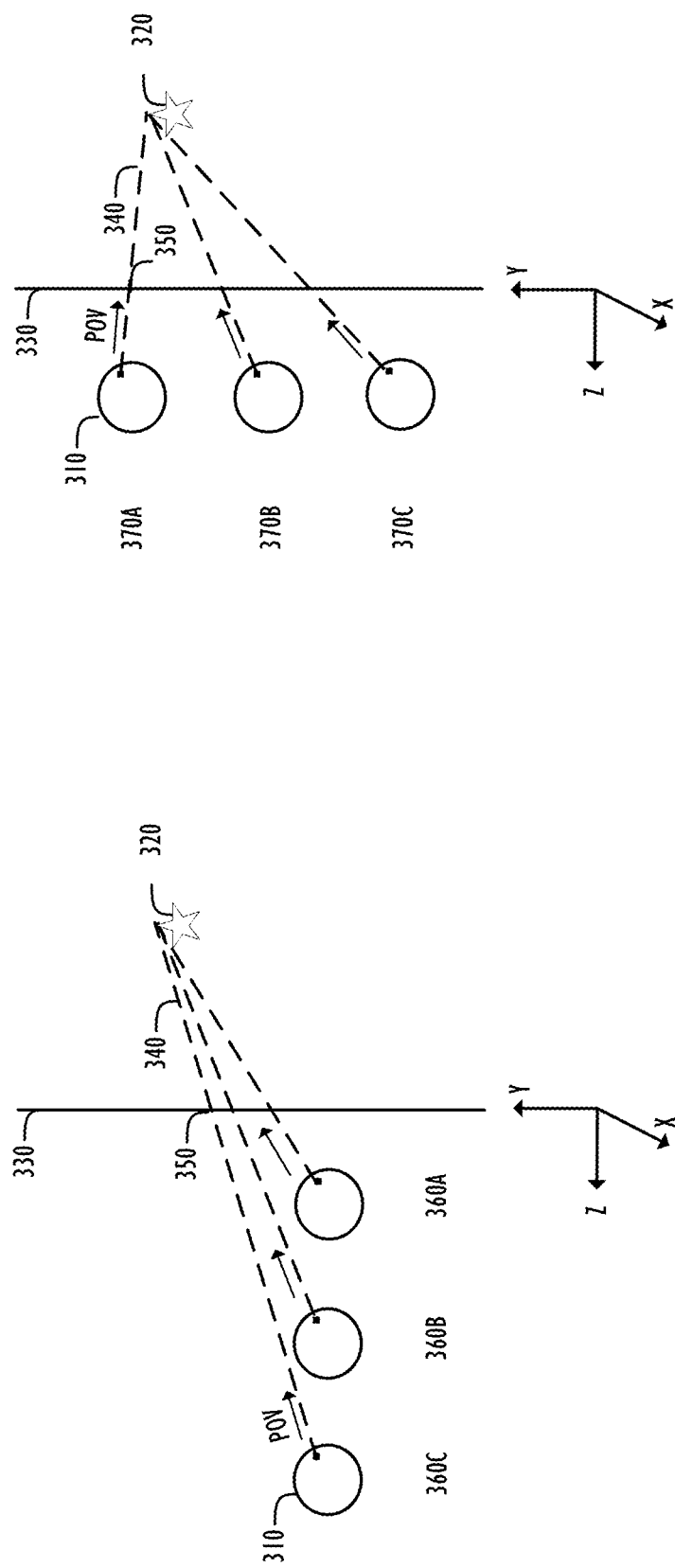
FIG. 3A illustrates a change of pixel position corresponding to a varying viewer's POV in accordance with one embodiment.
FIG. 3B illustrates a change of pixel position corresponding to a varying viewer's POV in accordance with another embodiment.

FIGS. 3A and 3B are provided to illustrate some basic image capture concepts to facilitate an understanding of the disclosed concepts. FIG. 3A illustrates a display 330 which is assumed to be parallel to the Y-axis (that is, in the X-Y plane) of an X-Y-Z coordinate system in world space. Viewer 310 sees object 320 through light ray 340 reflected from object 320 to himself at a specific POV. Assuming display 330 is equipped with image capture elements, the pixel that captures light ray 340 is at the intersection between light ray 340 and display 330 (i.e., pixel 350). When viewer 310 moves, for example, from location 360A to 360B and to 360C along the Z-axis, viewer 310's POV may change, and pixel 350 moves up display 330 along the Y-axis accordingly. The same principle applies when viewer 310 moves from location 370A to 370B and to 370C along the Y-axis, as illustrated in FIG. 3B. Viewer 310's POV may change, and pixel 350 moves down display 330 along the Y-axis accordingly. In short, when viewer 310 changes his view location, his POV may vary and pixels that capture images in accordance with his POV may change accordingly. One with ordinary skill in the art should appreciate such a relationship even when display 330 is not parallel to the Y-axis and/or viewer 310 changes his location along two or more of the X-Y-Z axes simultaneously.

Figure 4:
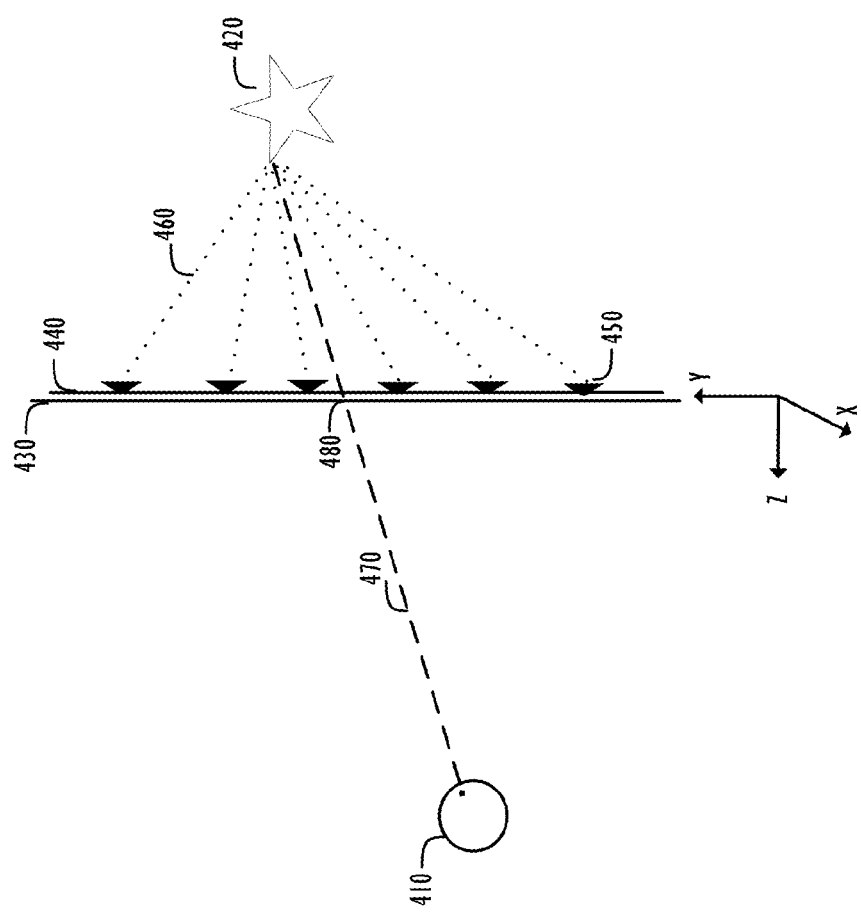
FIG. 4 illustrates an exemplary camera array integrated into a display in accordance with one embodiment.

If there are an infinite number of cameras filling the entire display, the display essentially becomes an ideal "light field" camera. This ideal "light field" camera can capture all light rays reflected from a scene to a viewer from various angles. Further, if the directions of the light rays are known, the viewer can determine which pixel on the display captures the light ray reflected from one particular point of the scene to the viewer position at a particular viewing angle. The viewer could then select this pixel to display the image of the particular point in accordance with his POV. However, in practice, only a finite number of cameras (e.g., a sparse array of cameras) can be used to capture images. FIG. 4 illustrates a camera array 440 in accordance with one embodiment. In FIG. 4, camera array 440 is integrated into display 430. Camera array 440 may also be arranged in other manners, e.g., standing-alone around display 430's periphery or at its corners. In practice, camera array 440 comprises a finite number (e.g., 9, 25, 49, 81 and 121) of cameras 450. Cameras 450 may capture light rays 460 reflected from object 420 in various directions. However, because camera array 440 includes only a finite number of cameras 450, not all the light rays are captured by the cameras. For example, light ray 470 reflected from object 420 to viewer 410 is not captured by camera array 440, which creates a "missing" pixel 480 on display 430 that corresponds to the uncaptured light ray 470.

Figure 5:
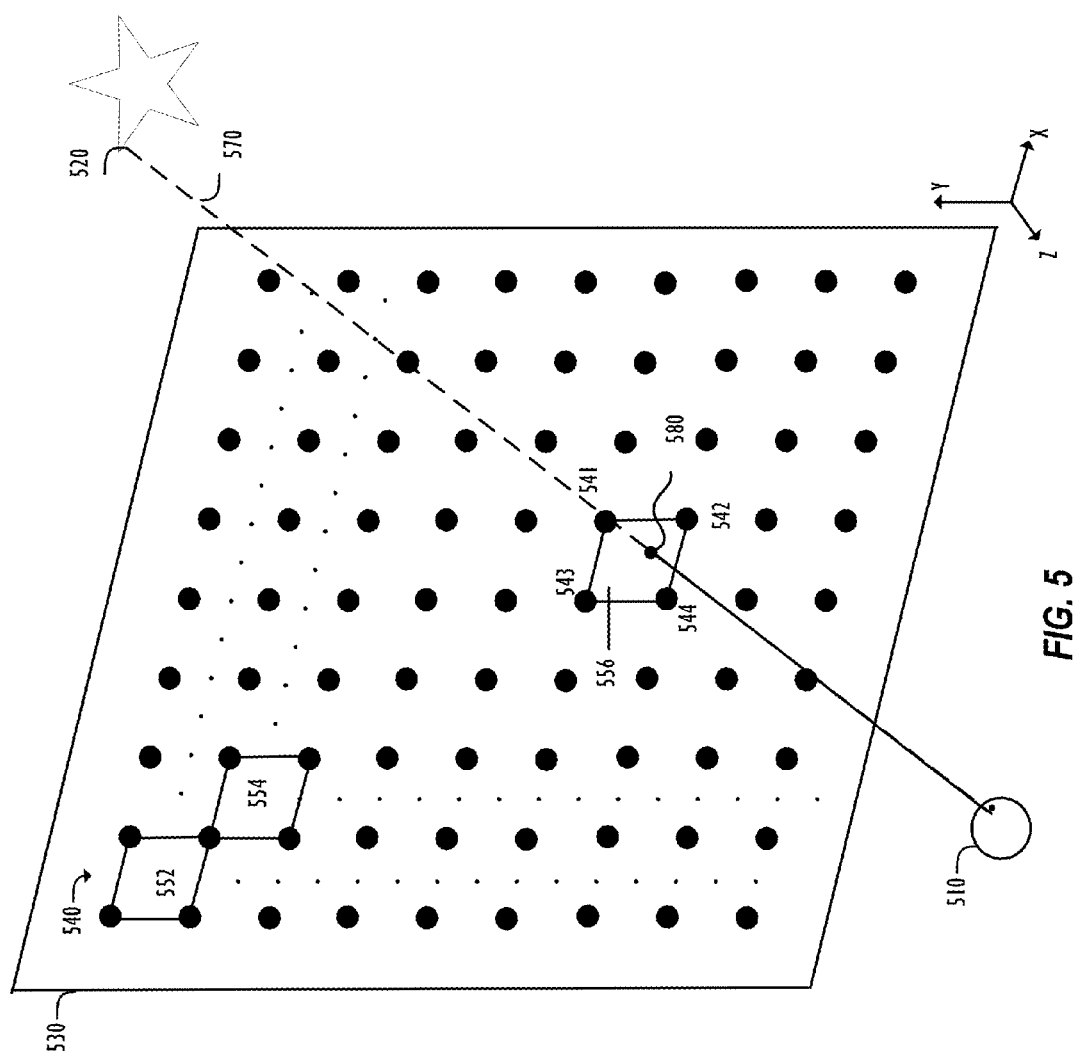
FIG. 5 illustrates tiles of a display and boundary cameras in accordance with one embodiment.

The missing pixel may be synthesized using pixels of images captured by camera array 440. In one embodiment, the missing pixel may be synthesized using pixels from images captured by the nearest cameras surrounding the missing pixel. Referring to FIG. 5, a camera array 540, assumed to be integrated into a display 530, comprises a plurality of cameras. Every four adjacent cameras in camera array 540 form a rectangular "tile" (e.g., tiles 552, 554 and 556). Tiles formed by camera array 540 may be of different shapes, e.g., rectangles, triangles, circles, or even shapes in 3-D, depending on the arrangement of camera array 540. "Missing" pixel 580 corresponds to uncaptured light ray 570 reflected from object 520 to viewer 510's position. As "missing" pixel 580 falls inside tile 556, boundary cameras 541-544 are the nearest cameras surrounding "missing" pixel 580. Thus, "missing" pixel 580 may be synthesized using pixels from images captured by boundary cameras 541-544. In one embodiment, pixel synthesis may employ image blending and different blending approaches may further be adopted. For example, the image blending operation may be based on interpolation of pixels from images captured the boundary cameras. The image blending operation may occur after the pixels have been mapped into 2-D display space. Mapping pixels into 2-D display space may include a first transformation from individual cameras' 3-D space to 3-D world space and a second transformation of projected pixels from 3-D world space to 2-D display space based on viewer 510's position. In one embodiment, these two transformations may be combined into a single transformation to improve computational efficiency.

In practice, for example, a party in a video conference sees not only a frame of one single point of a scene but rather the whole scene from his/her POV. Tracking light rays of the scene through the range of the viewer's field of view (FOV), different portions of the scene may be nearest to different cameras in the camera array. Thus, a frame mapped to the viewer's POV may be assembled by combining portions from different cameras. A camera captures images within its FOV. A FOV is the angle range that an image capturing unit, e.g., human visual system or a camera, can capture at its focal location. The FOV depends on several factors, e.g., the shape and size of aperture and the focal length of the image capturing unit. A typical FOV of digital cameras is around 70-degrees in both horizontal and vertical directions, while an average FOV of the human visual system is approximately 180- and 135-degrees in horizontal and vertical directions, respectively. With a larger FOV, an image capturing unit may capture a wider portion of the scene. Conversely, with a smaller FOV, an image capturing unit may capture a narrower portion of the scene. Since the FOV of a camera is typically less than that of human visual system, when a party joins a video conference using only a single camera, each party's view will be limited. A viewer may see only what the camera allows him to see, e.g., only what the camera captures at his counterparty's site and only from the camera's POV. One way to better understand this constraint is to envision the camera as a window in front the viewer. If an object sits within the window (i.e., inside the FOV of the camera), the viewer may see it. However, if the object falls outside the window (i.e., outside the FOV of the camera), the viewer may not be able to see it. Accordingly, as the window becomes smaller, the viewer will see less and less of a scene. Conversely, as the window enlarges, the viewer will see more and more of the scene. Ultimately, if the window becomes large enough, the viewer may see a "complete" view, which fills his entire FOV, of the scene. Further, as the viewer changes his POV from one direction to another, e.g., from left to right, from top to bottom, or from further to closer, he will see different portions of the scene accordingly.

In one embodiment, a camera array serves to capture images of a scene, and as a tool to measure the POV of a viewer at the viewer's site and provides this information to his counterparty, a speaker. The POV may be represented by the viewer's eye and/or head positions in the X, Y, and Z dimensions. The speaker's terminal uses this information to process captured images of the speaker's scene to provide frames to the viewer in correspondence to his (the viewer's) specific POV. This way, it provides a display to the viewer as if he were to see the speaker's scene from a first perspective. In another embodiment, the disclosed subject matter combines captured images of the camera array and provides a complete view to the viewer as if there were no "window" in front of him. In another embodiment, the disclosed subject matter assembles different portions of each camera's captured images into a frame representing the scene that best matches the viewer's varying POV. For example, as the viewer moves from one location to another, different pixels from different cameras will have the nearest ray to that location in the scene, resulting in a different portion of each camera being used to compose the frame.

Figure 6:
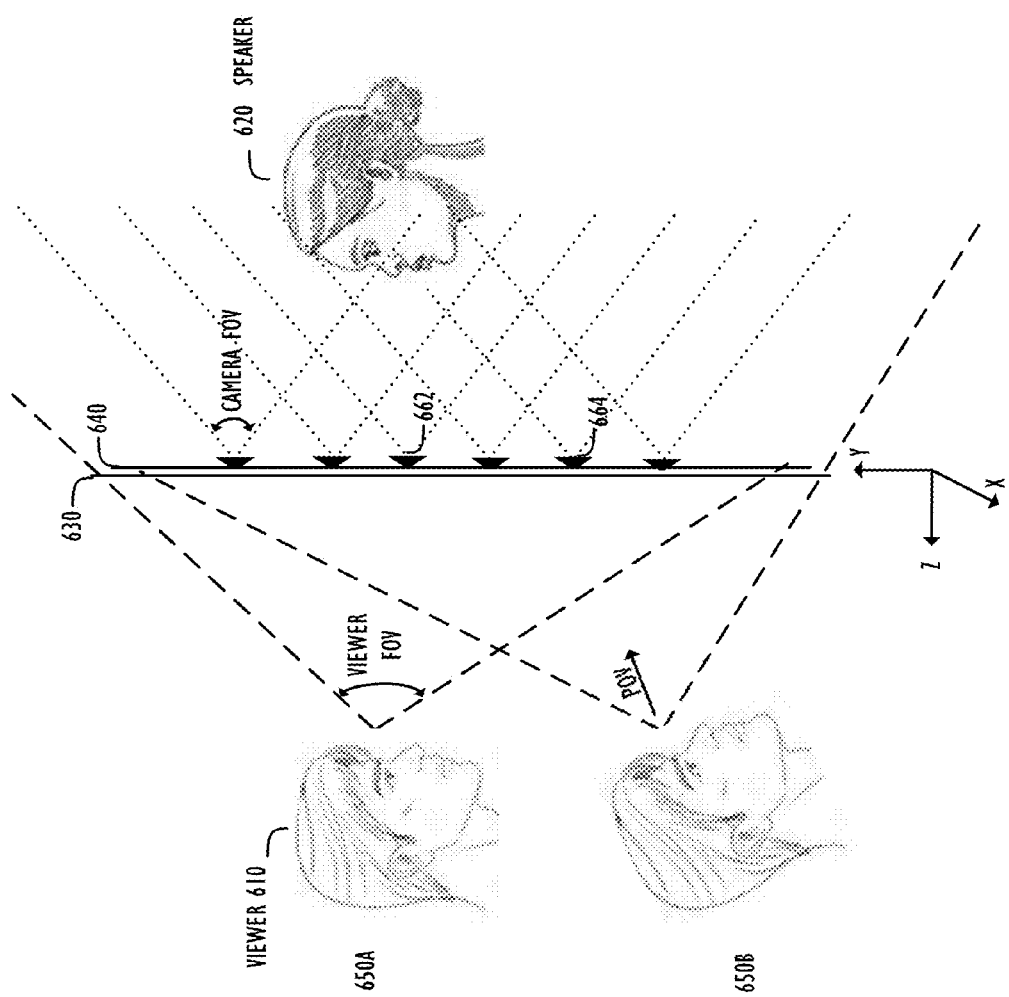
FIG. 6 illustrates the impact a viewer's POV has on pixel selections in accordance with one embodiment.

Image capture and processing operations in accordance with this disclosure begin at the pixel level; individual pixels are first selected from across the camera array. Once individual pixels are selected, individual tiles may be composed based on selected pixels inside the tiles. Once individual tiles are composed, they may be assembled together to provide a complete frame. The selection of pixels from captured images is accordance with the viewer's POV. This can be better understood in reference with FIG. 6. FIG. 6 illustrates a display 630 and a camera array 640 at speaker 620's site in accordance with one embodiment. Viewer 610's site is not shown because the explanation here focuses on operations that, in the disclosed embodiments, take place at speaker 620's site based on viewer 610's POV. One with ordinary skill in the art should appreciate that a second display and a second camera array may be available at viewer 610's site. Camera array 640 comprises a plurality of cameras, including cameras 662 and 664. To simplify explanation, it is assumed that the plurality of cameras all have the same FOV (70-degrees) and are oriented in the same direction. In another embodiment, the plurality of cameras may have different FOVs and different orientations from each other. Since each camera has a set perspective of a scene, each camera captures only the scene from that perspective and no one camera may provide a complete view of the scene from the viewer's perspective. Further, as viewer 610 moves from one location to another, his POV may change, and he may see different perspective of the scene. Thus, to assemble a frame representative of the complete view to viewer 610, all images captured by camera array 640 are combined. Further, to provide the frame in accordance with viewer 610's POV, a different portion of pixels may be selected from different cameras in accordance with his varying POV. For example, at location 650A viewer 610 sees mostly an upper portion of speaker 620. Accordingly, camera 662 has the best perspective of speaker 620's forehead from location 650A, while camera 664 has the best perspective of speaker 620's neck at the same location. Thus, camera 662 may contribute more pixels than camera 664 when assembling a frame corresponding to viewer 610's POV at location 650A. In contrast, when he moves to location 650B, viewer 610 sees mostly a lower portion of speaker 620. Therefore, camera 662 may contribute fewer pixels than camera 664 when assembling a frame in accordance with his POV at location 650B. As the viewer's POV with respect to a camera is approaching an edge of the camera's FOV (e.g., 35-degrees from the camera's midline), the camera will gradually contribute fewer and fewer pixels to the final frame. In an extreme case when the viewer's POV becomes greater than 35 degrees, what the viewer sees is beyond the FOV of the camera and thus the camera will not contribute any pixels to the final frame. In practice, for almost all view positions, the frame assembly will utilize pixels from all cameras: one set of cameras may contribute some of their pixels to fill in one portion of the frame (e.g., one tile), the next portion of the frame (e.g., a next tile) may be filled in by pixels from the next set of cameras, and so on until the entire frame is assembled.

Figure 7A:
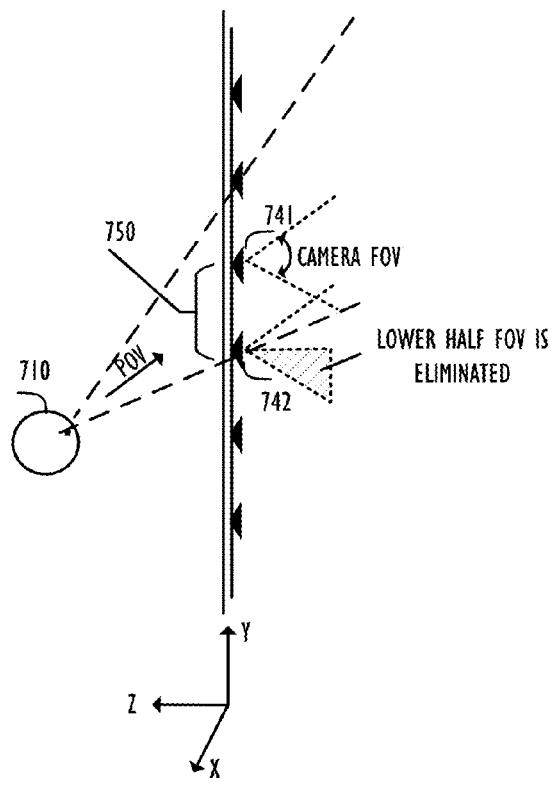
FIG. 7A illustrates a culling method based on a viewer's POV in accordance with one embodiment.
Figure 7B:
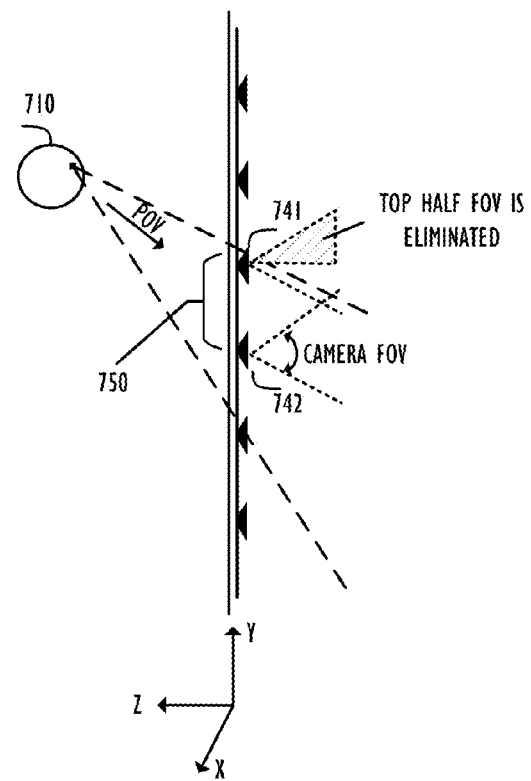
FIG. 7B illustrates a culling method based on a viewer's POV in accordance with another embodiment.

To improve efficiency, a "culling" operation may be employed at an early stage. Culling is an operation to eliminate pixels that will clearly not contribute to the final frame assembly given a specific viewer's location. Culling may be thought of as a light weight triage step that trims the pixels to regions containing pixels that will contribute to the assembled frame. The remaining pixels may still contain pixels that end up not contributing, but it is certain that those trimmed will not. Because the pixels will ultimately be processed and transferred from one party to another, culling reduces processing as well as the amount of data that needs to be transferred over a network which saves bandwidth and reduces latency. Culling may eliminate pixels from a tile when a viewer's POV corresponds to a given spatial relationship to one or more of the tile's boundary cameras. FIGS. 7A and 7B illustrate culling methods based on the viewer's POV in accordance with some embodiments. FIG. 7A illustrates a tile 750 surrounded by boundary cameras, including upper boundary camera 741 and lower boundary camera 742. For composing tile 750, certain pixels of images captured by boundary cameras 741-742 may be safely eliminated. For example, when viewer 710's POV is upwards (e.g., viewer 710's eye and/or head position is below camera 742), pixels corresponding to the lower half FOV of lower boundary camera 742 may be eliminated. In FIG. 7B, viewer 710 changes his POV to become downwards (e.g., viewer 710's eye and/or head position is above camera 741). In this case, pixels corresponding to the upper half FOV of upper boundary camera 741 may be eliminated. In other words, pixels of the boundary cameras corresponding to the shadow areas in FIGS. 7A and 7B may be trimmed by culling. The culling operation may also be applied to cameras at the left and/or right boundaries of individual tiles when the viewer's eye and/or head position is beyond the left and/or right boundaries of the tile.

Figure 8:
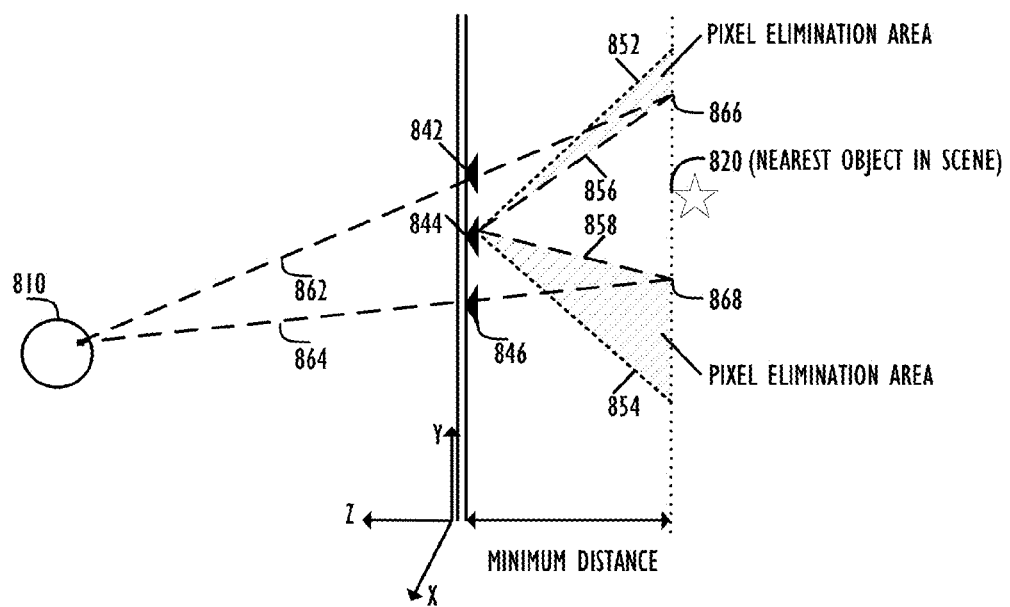
FIG. 8 illustrates a culling method based on a viewer's POV and knowledge of the nearest object in a speaker's scene in accordance with one embodiment.

FIG. 8 illustrated another culling method based on a viewer's POV and knowledge of the nearest object in a speaker's scene in accordance with one embodiment. In FIG. 8, a contracted FOV is defined in the vertical direction for individual cameras, e.g., camera 844, and only pixels within the contracted FOV are retained after culling. The contracted FOV of camera 844 is defined by the intersections of principle rays through its adjacent cameras (e.g., cameras 842 and 846) with a minimum distance of the nearest object (e.g., object 820), relative to the cameras, in the scene. Camera 844's FOV spans from edge 852 to edge 854 (e.g., 70-degrees) in the vertical direction. A first principle ray 862 "travels" through camera 842 to viewer 810 and intersects the minimum distance of object 820 in the scene at point 866. A second principle ray 864 "travels" through camera 846 to viewer 810 and intersects the minimum distance at point 868. The contracted FOV of camera 844 in the vertical direction may be defined by edges 856 and 858, where edge 856 connects the lens center of camera 844 and point 866, and edge 858 connects the lens center of camera 844 and point 868. Compared to its original FOV, this contracted FOV of camera 844 becomes smaller by the shadow areas, as illustrated in FIG. 8. Pixels of camera 844 outside this contracted FOV (i.e., corresponding to the shadow areas) may be eliminated. Similarly, a contracted FOV of camera 844 may be defined in the horizontal direction as well.

Figure 9A:
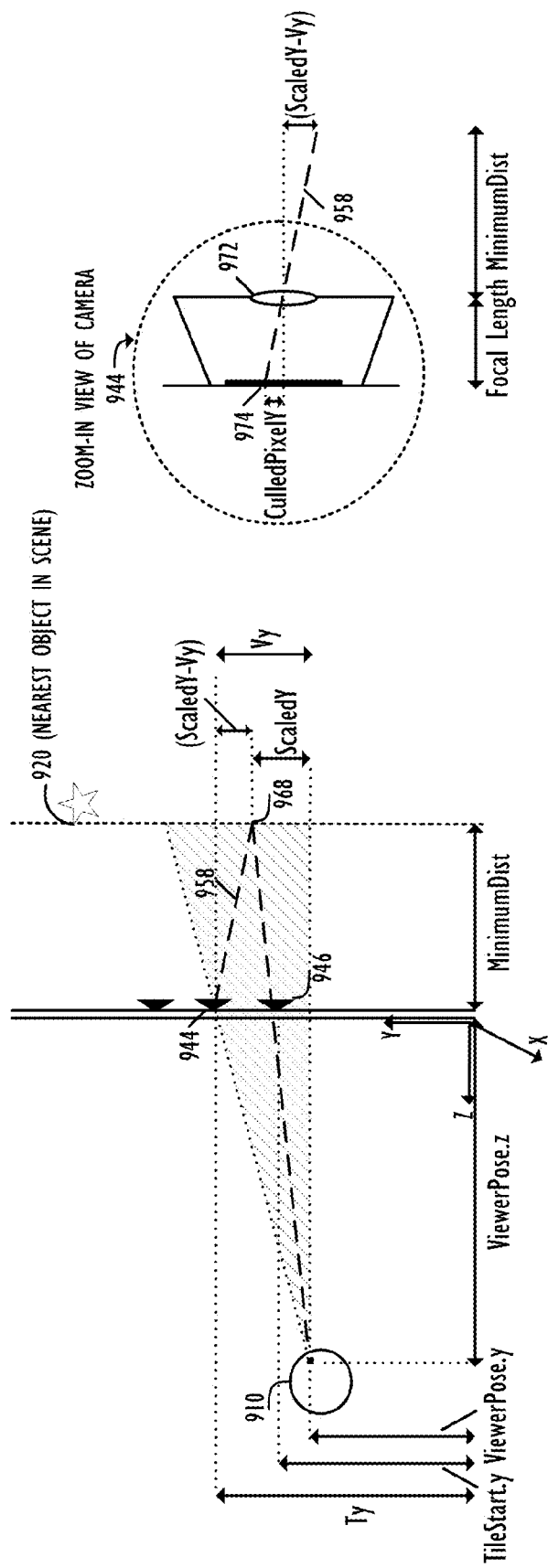
FIG. 9A illustrates a method to determine the pixel position corresponding to a lower edge of a camera's contracted field of view in the vertical direction in accordance with one embodiment.

FIG. 9A illustrates a method to determine the pixel position corresponding to a lower edge of a contracted FOV of a camera in the vertical direction in accordance with one embodiment. Lower edge 958 of the contracted FOV of camera 944 in the vertical direction may be defined by the relative positions of camera 944 and point 968. Several coordinates are illustrated in FIG. 9A to depict the positions of cameras 944, its adjacent camera 946, and viewer 910 in the Y-Z plane of an X-Y-Z coordinate system in 3-D world space. In particular, Ty, TileStart.y and ViewerPose.y represent the Y-coordinates of camera 944, camera 946, and viewer 910, respectively. ViewerPose.Z and MinimumDist represent the Z-coordinates of viewer 910 and the nearest object 920 in a scene, respectively. A zoom-in view of camera 944 is also provided to illustrate the position of the pixel in camera 944 corresponding to lower edge 958. In the zoom-in view, camera 944 comprises lens 972 and pixel 974, where the distance between the two is the focal length. The Y-coordinate of the pixel in camera 944 corresponding to lower boundary line 958 is CulledPixelY. According to FIG. 9A, CulledPixelY may be calculated by equation (1):

$$CulledPixelY = (ScaledY - Vy) \times \frac{Focal\ Length}{MinimumDist}, \quad (1)$$

where Vy, ScaledY, Focal Length and MinimumDist represent the quantities illustrated in FIG. 9A. Further, (ScaledY−Vy) may be calculated by equation (2):

$$(ScaledY - Vy) = \quad (2)$$
$$(TileStart \cdot y - ViewerPose \cdot y) \times \frac{ViewerPose \cdot z + MinimumDist}{ViewerPose \cdot z} -$$
$$(Ty - ViewerPose \cdot y),$$

where Ty, TileStart.y, ViewerPose.y and ViewerPose.z represent the quantities illustrated in FIG. 9A. Substituting equation (2) into equation (1), CulledPixelY may then be determined by:

$$CulledPixelY = \Big[(TileStart \cdot y - Ty) + \quad (3)$$
$$(TileStart \cdot y - ViewerPose \cdot y) \times \frac{MinimumDist}{ViewerPose \cdot z}\Big] \times \frac{Focal\ Length}{MinimumDist},$$

It is noted that the sign of CulledPixelY may be defined as negative for the lower edge of the contracted FOV of a camera. It is because the (0, z) position of the captured image in the Y-Z plane may be defined at the camera's principal point at the optical center of the camera. According to this definition, the sign of CulledPixelY is generally negative for the lower edge of the contracted FOV and positive for the upper edge of the contracted FOV.

Figure 9B:
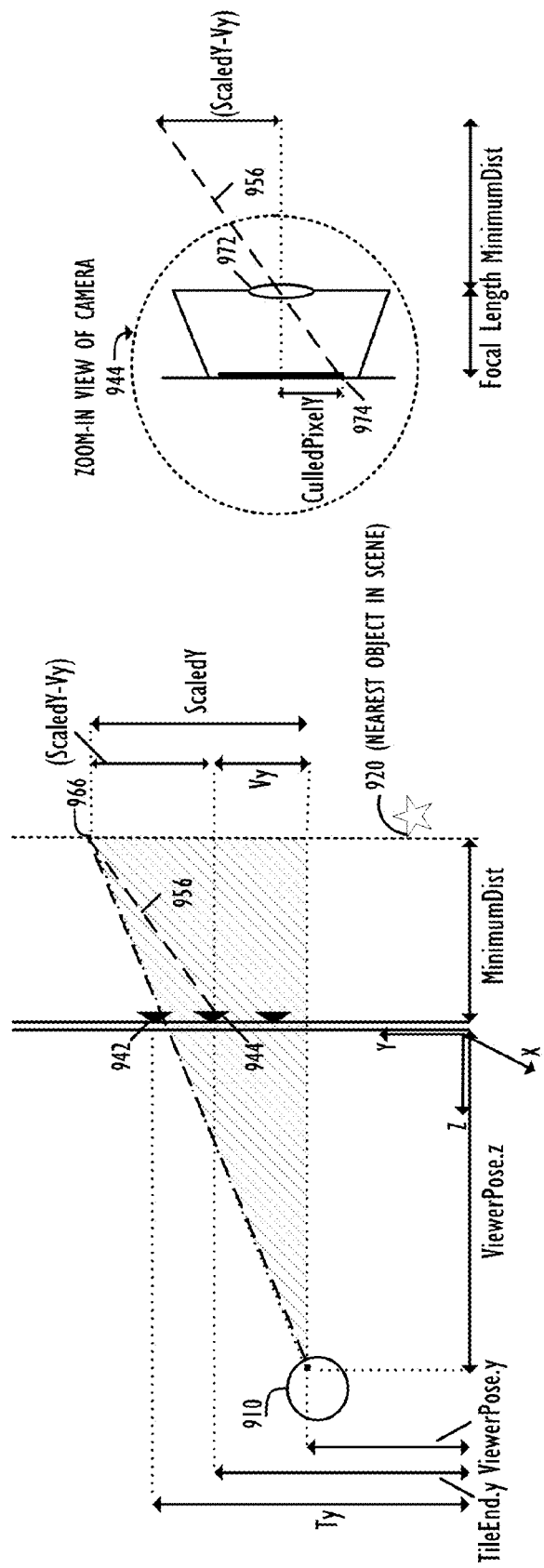
FIG. 9B illustrates a method to determine the pixel position corresponding to an upper edge of a camera's contracted field of view in the vertical direction in accordance with one embodiment.

FIG. 9B illustrates a similar method to determine the pixel position corresponding to an upper edge of a contracted FOV of a camera in the vertical direction in accordance with one embodiment. Referring to FIG. 9B, upper edge 956 of the contracted FOV of camera 944 in the vertical direction may be defined by the relative positions of camera 944 and point 966. Several coordinates are illustrated in FIG. 9B to depict the positions of cameras 944, its adjacent camera 942, and viewer 910 in the Y-Z plane of an X-Y-Z coordinate system of 3-D world space. In particular, Ty, TileEnd.y and ViewerPose.y represent the Y-coordinates of camera 944, camera 942 and viewer 910, respectively. ViewerPose.Z and MinimumDist represent the Z-coordinates of viewer 910 and the nearest object 920 in the scene, respectively. A zoom-in view of camera 944 is also provided to illustrate the position of the pixel in camera 944 corresponding to upper edge 956. In the zoom-in view, camera 944 comprises lens 972 and pixel 974, where the distance between the two is the focal length. The Y-coordinate of the pixel in camera 944 corresponding to upper boundary line 956 is CulledPixelY. According to FIG. 9B, CulledPixelY may be calculated by equation (4):

$$CulledPixelY = (ScaledY - Vy) \times \frac{Focal\ Length}{MinimumDist}, \quad (4)$$

where Vy, ScaledY, Focal Length and MinimumDist represent the quantities illustrated in FIG. 9B. Further, (ScaledY−Vy) may be calculated by equation (5):

$$(ScaledY - Vy) = \quad (5)$$
$$(TileEnd \cdot y - ViewerPose \cdot y) \times \frac{ViewerPose \cdot z + MinimumDist}{ViewerPose \cdot z} -$$
$$(Ty - ViewerPose \cdot y),$$

where Ty, TileEnd.y, ViewerPose.y and ViewerPose.z represent the quantities illustrated in FIG. 9B. Substituting equation (5) into equation (4), CulledPixelY may then be calculated by equation (6):

$$CulledPixelY = \Big[(TileEnd \cdot y - Ty) + \quad (6)$$
$$(TileEnd \cdot y - ViewerPose \cdot y) \times \frac{MinimumDist}{ViewerPose \cdot z}\Big] \times \frac{Focal\ Length}{MinimumDist},$$

Similarly, the methods may be applied to calculate positions of the pixels corresponding to the left and/or right edges of a contracted FOV of a camera in the horizontal direction.

As described above, the composition (or rendering) of tiles is based on the viewer's POV. The composed tiles may then be transmitted through a network connection from the speaker (the viewer's counterparty) to the viewer, and a frame may be assembled and displayed at the viewer's terminal. The delay, so-called render-to-display latency, between rendering of the tiles and display of the frame may reach tens to hundreds of milliseconds. During the render-to-display latency, the viewer's POV may change. In some embodiments, the change of viewer's POV during the latency and its impact on display of the assembled frame may be compensated. For example, the tracking of the viewer's POV may include motion prediction. The motion prediction may provide an estimation of the expected viewer's POV right before the display (or after the rendering-to-display latency). This estimated viewer's POV, instead of measured viewer's POV before the rendering, may be used in the pixel culling and following operations. Further, a late warping operation may also be included, which may adjust the assembled frame using the viewer's POV measured at the last instant before display. The change in the viewer's POV may be determined based on, for example, the change of the viewer's eye and/or head position. The change of the viewer's eye and/or head position may be measured based on tracking of the viewer's eye and/or head position at the last instant before display, or be predicted based on a motion model of the viewer, or a combination of both measurement and modeling. Given an estimation of the change in the viewer's POV, the pixels in the composed tiles (received from the speaker by the viewer) may be warped accordingly to approximate the correct view of the viewer (where the "correct" view corresponds to the viewer's POV of the speaker immediately before a view of the speaker is displayed to the viewer). For example, in the simplest form, the assembled frame may be translated, rotated, and/or scaled to adjust for the change of viewer's POV before and after the render-to-display latency. In more advanced methods, the pixels in the composed tiles, which may still have associated depth information, may be reverse-transformed to the 3-D world space or the individual cameras' 3-D space, based on the viewer's original POV. Next, the pixels may be transformed (or mapped) back to the 2-D display space based on the viewer's new (or changed) POV, e.g., for both left and right eyes of the viewer. The newly mapped pixels may then be used to adjust the display of the frame. An alternative warping operation may tessellate each individual tile into a texture-mapped mesh. The vertices of the mesh may be reverse-transformed to the 3-D space and then transformed back to the 2-D display space, as described above. This may result in a distorted mesh for each tile that approximates the correct view of the viewer. This alternative warping operation may prevent an introduction of dis-occlusion regions (or "holes") as a result of the change in the viewer's POV.

Figure 10:
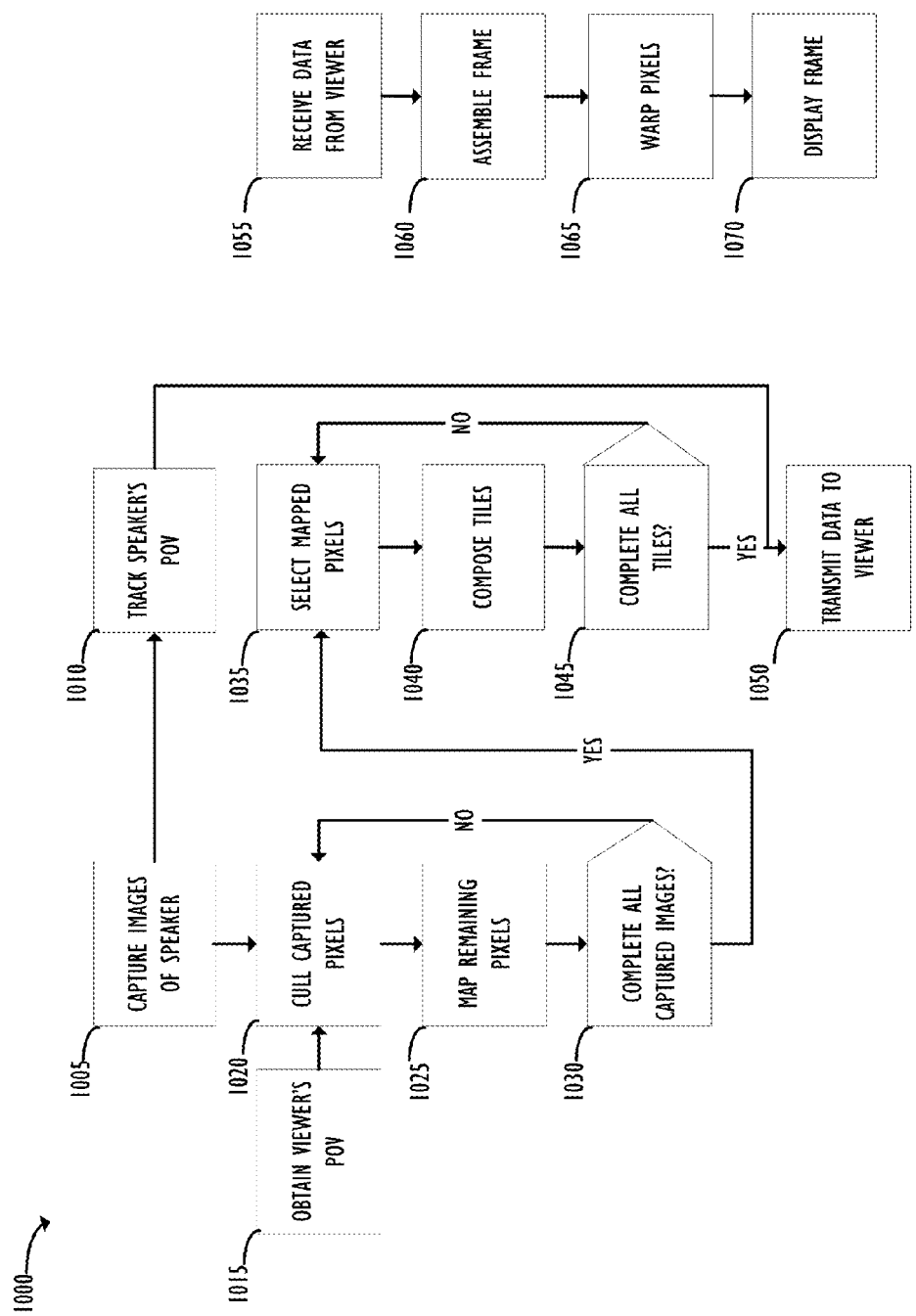
FIG. 10 illustrates a flowchart of an image capture and processing operation in accordance with one embodiment.

Referring to FIG. 10, exemplary image operation 1000 in accordance with one embodiment captures images, including information to compute depth, of a first scene, which may include a speaker (block 1005). The speaker's POV may be tracked based on the captured images (block 1010). The speaker's POV may also be tracked using one or more cameras or other devices, separate from the camera array, dedicated for the tracking purposes. Data representative of the POV of his counterparty, a viewer, may be transmitted from the viewer's terminal and received by the speaker's terminal through a network connection (block 1015). Next, pixels of the captured images of the speaker may be culled to identify remaining pixels (block 1020). The culling operation may employ the viewer's POV and/or knowledge of the nearest object in the speaker's scene, as described above. Certain pixels, e.g., corresponding to one half of FOV and/or outside a contracted FOV of individual cameras, may be eliminated in culling. The remaining culled pixels are then mapped from individual cameras' 3-D space to 2-D display space (block 1025). The mapping operation may project pixels for both left and right eyes of the viewer. The pixel culling and mapping operations may repeat themselves until the images captured by the camera array are processed (block 1030). The pixel culling and mapping operations may be implemented by dedicated hardware, e.g., a dedicated processor (tile processor), within the speaker's terminal. There may be one tile processor for each camera or one tile processors for several cameras. Once the pixel culling and mapping is finished, operation 1000 moves to frame assembling. Operation 1000 may begin with pixel selection where different pixels may be selected from different cameras based on the viewer's POV (block 1035). The selected pixels may be used to synthesize missing pixels which in turn compose individual tiles (block 1040). As described above, the pixel synthesis and tile composition may employ different image blending techniques, e.g., interpolation. The synthesis and composition operations may repeat themselves until all the tiles for display are composed (block 1045). Finally, data, such as the composed tiles and the speaker's POV, may be transmitted from the speaker's terminal to the viewer's terminal through the network connection (block 1050). Separately, the speaker's terminal may also receive data from the viewer's terminal (block 1055), which may include composed tiles based on images captured at the viewer's site. Subsequently, operation 1000 may assemble the composed tiles into a frame (block 1060), representing the viewer's scene. A late warping operation may be applied to compensate for a change of the speaker's POV (note that the speaker now plays a role as a viewer) that may occur during the render-to-display latency, as described above (block 1065). Finally, the frame may be displayed at the speaker's terminal (block 1070). The frame may be assembled and displayed for both left and right eyes of the viewer. The tile composition and frame assembly operations may be implemented by dedicated hardware, e.g., a frame assembler, within the speaker's terminal.

As aforementioned, the terms "speaker" and "viewer" are used here to facilitate an explanation of the disclosed concepts. In applications such as a video conference, each party behaves as both speaker and viewer with respect to his/her counterparty. Thus, operation 1000 in FIG. 10 takes place continuously within the terminal of each party (e.g., operations in one terminal as a mirror process to operations in another). This provides each party a continuous display of frames (i.e., a live video) of his/her counterparty based on the party's POV. Further, there may be variants about the data to be transmitted from one terminal to another. As described above, the speaker's terminal may transmit the composed tiles to the viewer's terminal, while the viewer's terminal may subsequently assemble the composed tiles into a frame (e.g., block 1060 but at the viewer's terminal). In another embodiment, the speaker's terminal may transmit the mapped pixels of captured images to the viewer's terminal. Subsequently, the viewer's terminal may complete the rest of image operations, including tile composition, and frame assembly (e.g., blocks 1035-1045 and 1060 but at the viewer's terminal). In still another embodiment, the speaker's terminal may transmit the pixels of captured images to the viewer's terminal. Subsequently, the viewer's terminal may complete the other image operations (e.g., blocks 1020-1045 and 1060 but at the viewer's terminal). In still another embodiment, the speaker's terminal may assemble the composed tiles into a frame (e.g., block 1060 but at the speaker's terminal) and send the assembled frame to the viewer's terminal. Further, in applications such as immersive augmented reality, live display wall, and head mounted display, there may be only one viewer all the time. Alternatively, in some embodiments, operation 1000 may not require tracking of the speaker's POV (or block 1010 may be removed).

Figure 11:
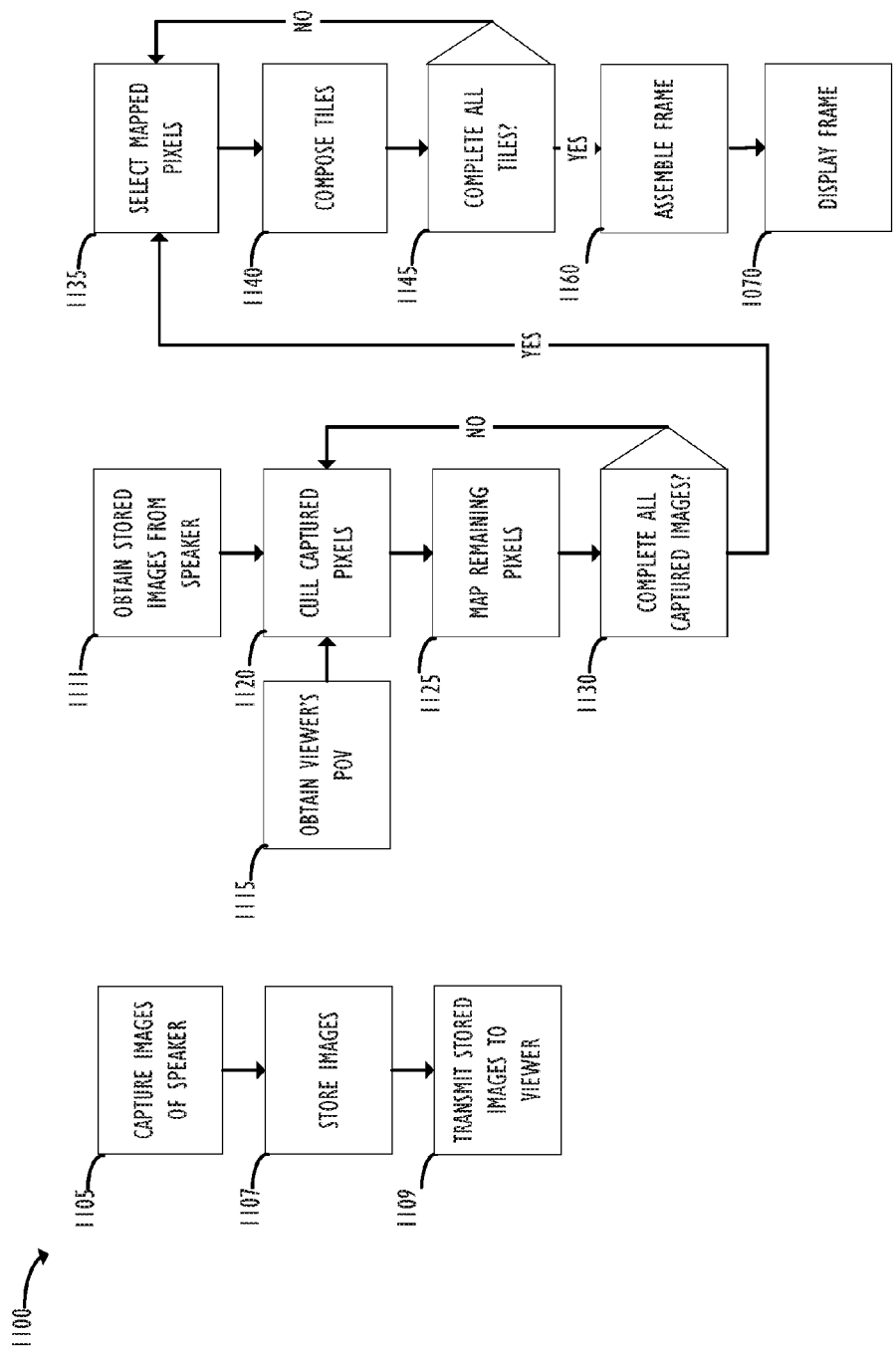
FIG. 11 illustrates a flowchart of an image capture and processing operation, including image storage, in accordance with one embodiment.

FIG. 11 illustrates the flowchart of another exemplary image operation 1100 in accordance with another embodiment. Operation 1100 is substantially similar to operation 1000 illustrated in FIG. 10. Referring to FIG. 11, a first camera array captures images, including information to compute depth, of a first scene (block 1105), similarly to block 1005 in FIG. 10. The captured images may be stored to media such as local memory, portable memory, or other types of remote or cloud memory (block 1107). Stored images may be used in playback or other image processing in future. The stored images may be sent to a viewer (block 1109). Once the stored images are received (block 1111), they may be processed to assemble frames for the viewer. The image processing operation is substantially similar to the above-described in FIG. 10. The set of operations illustrated by blocks 1120-1145 and 1160-1170 may be the same as the set of operations illustrated by blocks 1020-1045 and 1060-1070, except that blocks 1120-1145 and 1160-1170 take place at the viewer's terminal while blocks 1020-1045 and 1060-1070 at the speaker's terminal. In other words, they may be the same operations that just occur at different terminals. Further, in FIG. 11, the viewer's POV may be readily available at his own terminal (block 1115). Note that operation 1100 may not include the late warping operation (e.g., block 1065) since late warping may not be required in all implementations.

Figure 12:
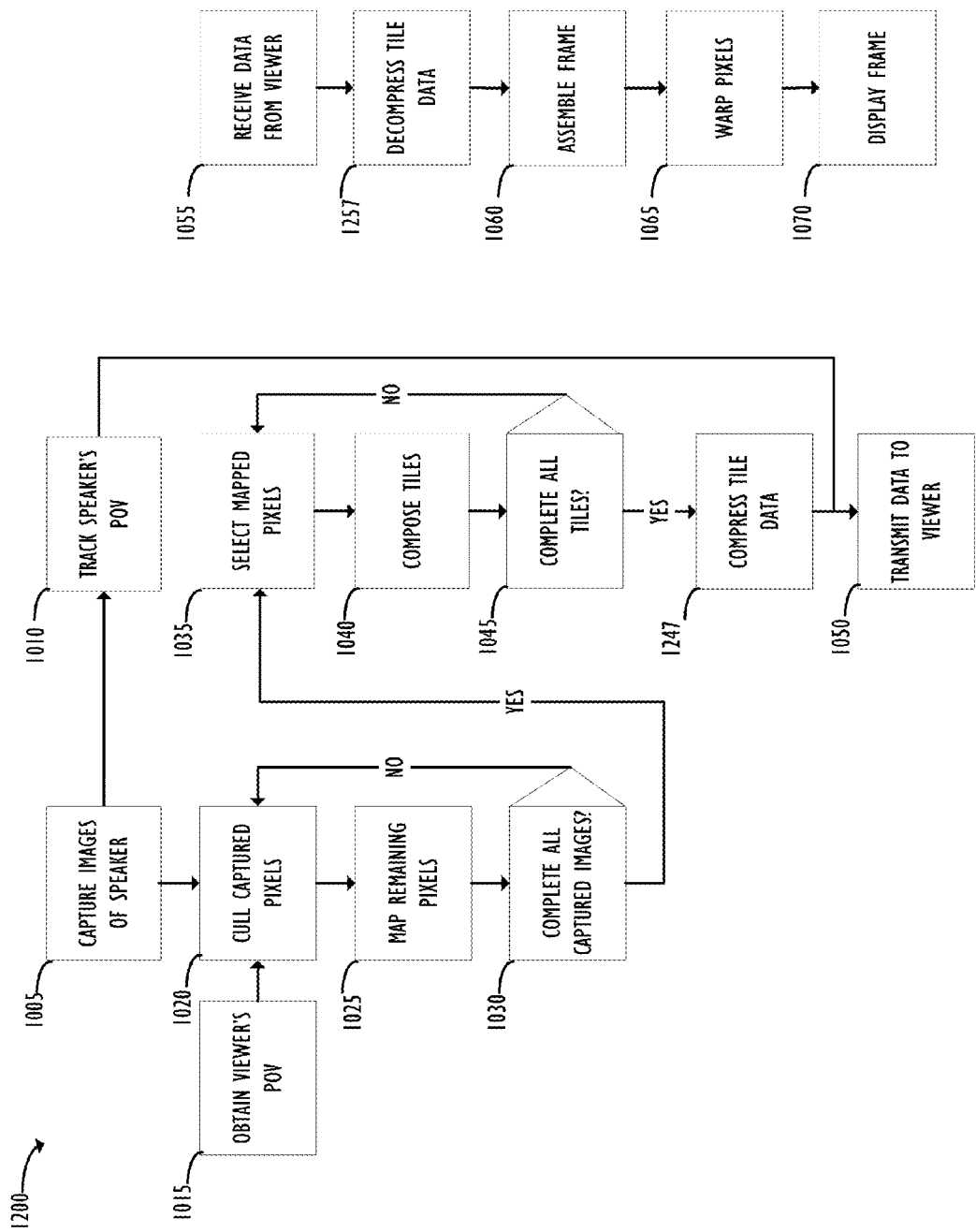
FIG. 12 illustrates a flowchart of an image capture and processing operation, including pixel compression and decompression, in accordance with one embodiment.

FIG. 12 illustrates the flowchart of another exemplary image operation 1200 in accordance with another embodiment. Operation 1200 is based on operation 1000 illustrated in FIG. 10. Operation 1200 may include all the blocks of operation 1000 except additional operations of data compression and decompression (blocks 1247 and 1257). Referring to FIG. 12, the mapped pixels may be compressed before being transmitted (block 1247). The compressed pixels may then be decompressed after being received (block 1254). As described above, operation 1000 may implement pixel culling and mapping using one set of hardware, e.g., tile processors, and tile composition and frame assembly using a different set of hardware, e.g., frame assembler. Pixel data may be transferred between different hardware. Compression of pixels reduces the amount of data for transferring and improves the link efficiency. Further, as described above, for applications such as immersive augmented reality, live display wall, and head mounted display, there may be only one viewer all the time. Alternatively, in some embodiments, operation 1200 may not require tracking of the speaker's POV (or block 1010 may be removed).

Figure 13:
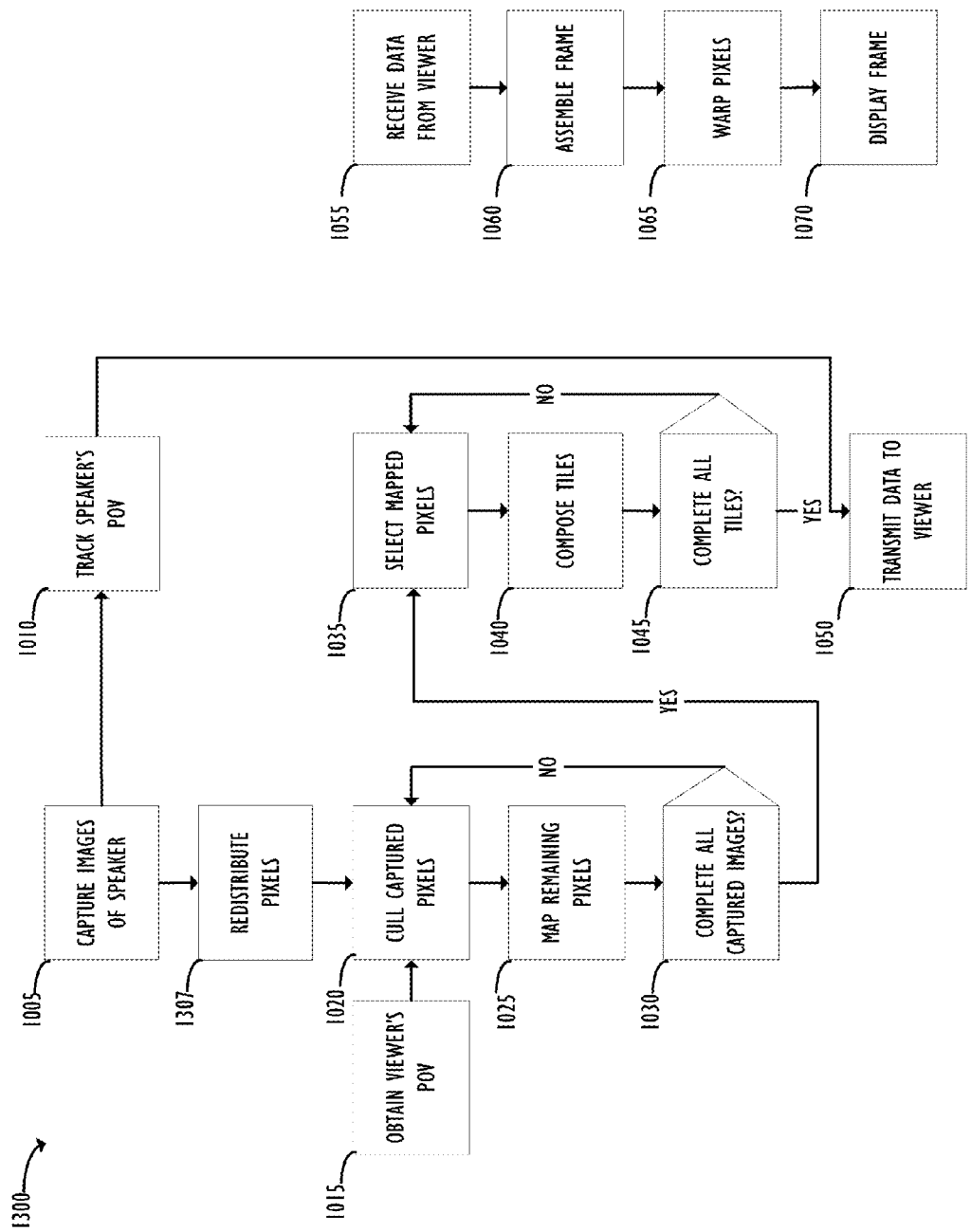
FIG. 13 illustrates a flowchart of an image capture and processing operation, including pixel redistribution, in accordance with one embodiment.

FIG. 13 illustrates the flowchart of another exemplary image operation 1300 in accordance with another embodiment. Operation 1300 is based on operation 1000 illustrated in FIG. 10. Operation 1300 may include all the blocks of operation 1000 except an additional operation of pixel redistribution (block 1307). As described above, there may be multiple tile processors responsible for the operation of pixel culling and mapping. Referring to FIG. 13, pixels of the captured images may be redistributed across the tile processors before culling (block 1307). Pixel redistribution may allow a terminal to allocate hardware resources to manage image processing more efficiently. As described above, in some embodiments, operation 1300 may not require tracking of the speaker's POV (or block 1010 may be removed).

Figure 14:
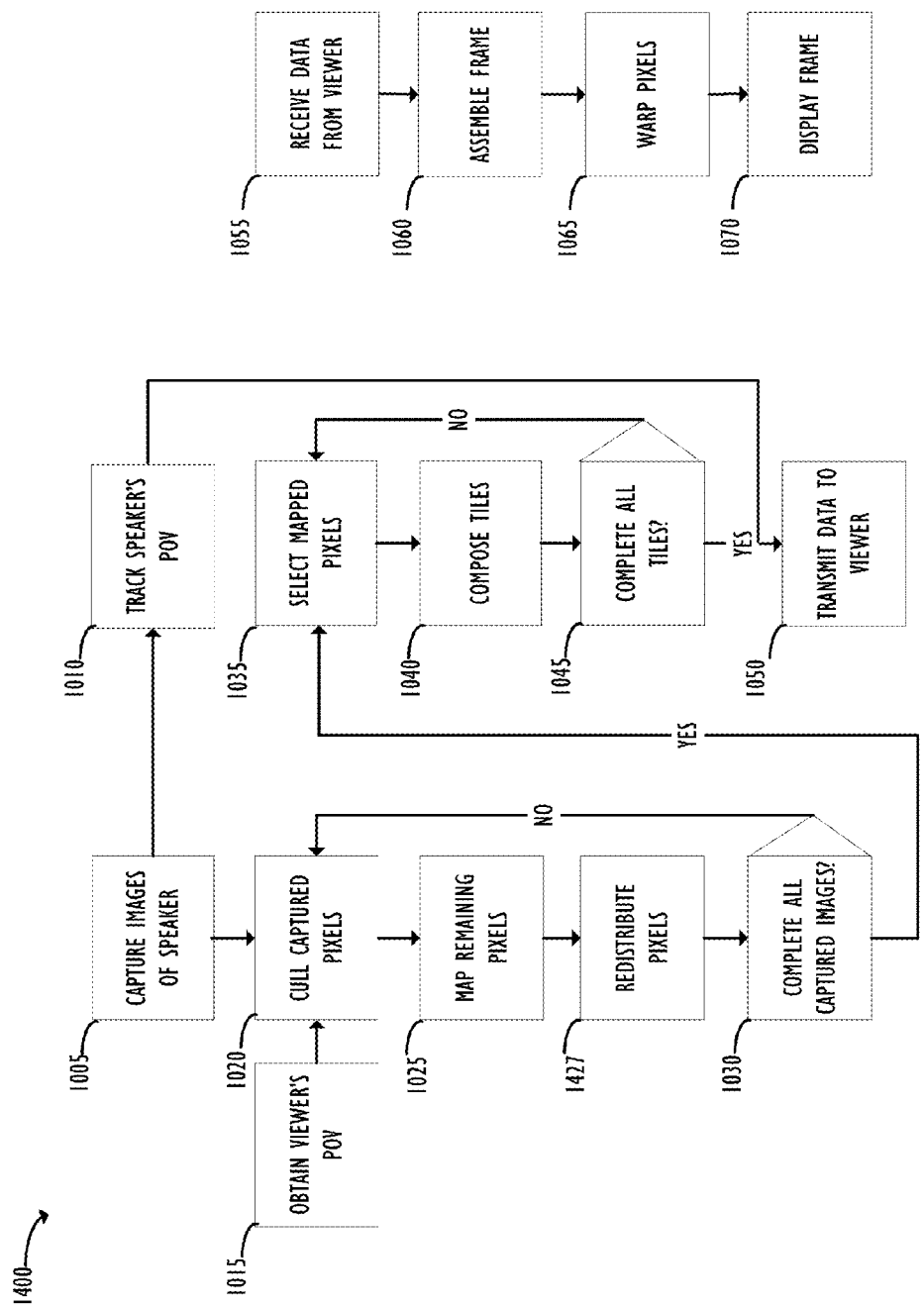
FIG. 14 illustrates a flowchart of an image capture and processing operation, including pixel redistribution, in accordance with another embodiment.

The pixels redistribution may also be performed at a different stage as illustrated in FIG. 14. In FIG. 14, image operation 1400 is based on operation 1000 illustrated in FIG. 10. Operation 1400 may include all the blocks of operation 1000 except an additional operation of pixel redistribution (block 1427). Referring to FIG. 14, pixels may be redistributed across the tile processors after mapping. Similarly, in some embodiments, operation 1400 may not require tracking of the speaker's POV (or block 1010 may be removed).

Figure 15:
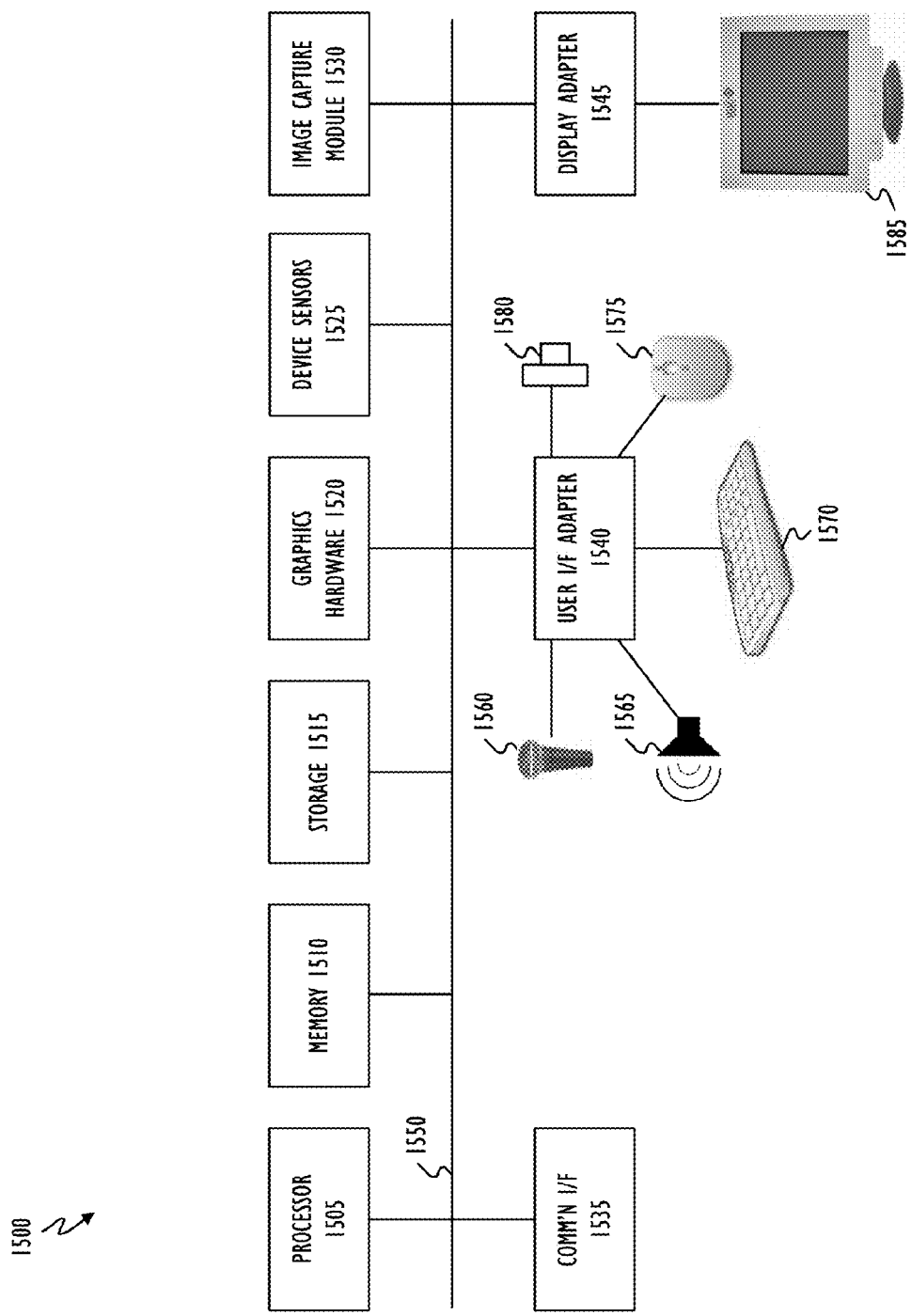
FIG. 15 illustrates a computer system in accordance with one embodiment.

Referring to FIG. 15, the disclosed image capture and processing operations in accordance with this disclosure may be performed by representative computer system 1500 (e.g., a general purpose computer system such as a desktop, laptop, notebook or tablet computer system). Computer system 1500 may include one or more processors 1505, memory 1510, one or more storage devices 1515, graphics hardware 1520, device sensors 1525 (e.g., 3D depth sensor, proximity sensor, ambient light sensor, accelerometer and/or gyroscope), image capture module 1530, communication interface 1535, user interface adapter 1540 and display adapter 1545 —all of which may be coupled via system bus or backplane 1550 which may be comprised of one or more continuous (as shown) or discontinuous communication links. Memory 1510 may include one or more different types of media (typically solid-state) used by processors 1505 and graphics hardware 1520. For example, memory 1510 may include memory cache, read-only memory (ROM), and/or random access memory (RAM). Storage 1515 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1510 and storage 1515 may be used to retain media (e.g., audio, image and video files), preference information, device profile information, computer program instructions or code organized into one or more modules and written in any desired computer programming language, and any other suitable data. When executed by processor(s) 1505 and/or graphics hardware 1520 such computer program code may implement one or more of the methods described herein. Image capture module 1530 may include one or more image sensors, one or more lens assemblies and any memory, mechanical actuators (e.g., to effect lens movement), and processing elements used to capture images. Image capture module 1530 may also provide information to processors 1505 and/or graphics hardware 1520. Communication interface 1535 may be used to connect computer system 1500 to one or more networks. Illustrative networks include, but are not limited to, a local network such as a USB network, an organization's local area network, and a wide area network such as the Internet. Communication interface 1535 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 1540 may be used to connect microphone 1560, speaker 1565, keyboard 1570, pointer device 1580, and other user interface devices such as a touch-pad and/or a touch screen and a separate image capture element (not shown). Display adapter 1545 may be used to connect one or more display units 1585 which may provide touch input capability. Processor 1505 may be a system-on-chip such as those found in mobile devices and include one or more dedicated graphics processing units (GPUs). Processor 1505 may be based on reduced instruction-set computer (RISC) or complex instruction-set computer (CISC) architectures or any other suitable architecture and may include one or more processing cores. Graphics hardware 1520 may be special purpose computational hardware for processing graphics and/or assisting processor 1505 perform computational tasks. In one embodiment, graphics hardware 1520 may include one or more programmable GPUs and each such unit may include one or more processing cores.

The invention claimed is:

1. An image capture and processing operation, comprising:
   capturing images of a first scene associated with a first party by a first camera array, the first camera array having a first plurality of cameras;
   obtaining information representative of a point of view of a second party;
   identifying a first set of tiles based on arrangement of the first camera array;
   culling pixels of the images captured by the first camera array, based on the point of view of the second party, and identifying remaining pixels;
   composing the first set of tiles of the first scene based on the remaining pixels; and
   transmitting the first set of composed tiles to the second party.

2. The operation of claim 1, wherein the point of view of the second party is obtained based on monitoring at least one of eye position and head positions of the second party.

3. The operation of claim 1, wherein culling pixels comprises:
   identifying a plurality of boundary cameras for each tile of the first set of tiles; and
   eliminating pixels from a tile when the point of view of the second party corresponds to a given spatial relationship to one or more of the tile's boundary cameras.

4. The operation of claim 1, wherein culling pixels comprises:
   identifying a plurality of boundary cameras for each tile of the first set of tiles;
   obtaining information of a nearest object, relative to the first camera array, in the first scene;
   identifying, for at least one tile, a contracted field of view for the at least one tile's boundary cameras based on the point of view of the second party and the information of the nearest object in the first scene; and
   eliminating pixels corresponding to areas outside the contracted field of view.

5. The operation of claim 3, further comprising:
   transforming the remaining pixels from at least some of the first plurality of cameras' three-dimensional (3-D) space to a 3-D world space; and
   transforming at least some of the remaining pixels from the 3-D world space to a two-dimensional (2-D) display space for left and right eyes of the second party.

6. The operation of claim 5, wherein composing the first set of tiles comprises:
   selecting pixels from each tile that have been transformed into the 2-D display space based on the point of view of the second party;
   synthesizing pixels for each tile using the selected pixels; and
   composing each tile using the synthesized pixels.

7. The operation of claim 1, further comprising:
   receiving a second set of composed tiles from a second camera array associated with the second party;
   warping pixels of the second set of composed tiles, based on a late estimation of a change in a point of view of the first party; and
   assembling a frame using the second set of composed tiles.

8. A system for image capture and processing, comprising:
   a first camera array having a first plurality of cameras;
   a network connector;
   memory coupled to the first camera array and the network connector; and
   one or more processors coupled to the first camera array, the network connector, and the memory, the one or more processors configured to execute program code stored in the memory, the program code configured to cause the one or more processors to—
      capture images of a first scene associated with a first party using the first camera array;
      obtain information representative of a point of view of a second party through the network connector;
      identify a first set of tiles based on arrangement of the first camera array;
      cull pixels of the images captured by the first camera array, based on the point of view of the second party, and identifying remaining pixels;
      compose the first set of tiles of the first scene based on the remaining pixels; and
      transmit the first set of composed tiles through the network connector to the second party.

9. The system of claim 8, wherein the first camera array is configured to:
   be integrated into a first display;
   capture the images of the first scene; and
   acquire information to compute depth data of the first scene.

10. The system of claim 8, wherein the program code is further configured to cause the one or more processors to track a point of view of the first party based on monitoring at least one of eye position and head positions of the first party.

11. The system of claim 8, wherein the program code to cull pixels is configured to cause the one or more processors to:
   identify a plurality of boundary cameras for each tile of the first set of tiles; and
   eliminate pixels from a tile when the point of view of the second party corresponds to a given spatial relationship to one or more of the tile's boundary cameras.

12. The system of claim 8, wherein the program code to cull pixels comprises program code to:
   identify a plurality of boundary cameras for each tile of the first set of tiles;
   obtain information of a nearest object, relative to the first camera array, in the first scene;
   identify, for at least one tile, a contracted field of view for the at least one tile's boundary cameras based on the point of view of the second party and the information of the nearest object in the first scene; and
   eliminate pixels corresponding to areas outside the contracted field of view.

13. The system of claim 11, wherein the program code is further configured to cause the one or more processors to:
   transform the remaining pixels from at least some of the first plurality of cameras' three-dimensional (3-D) space to a 3-D world space; and
   transform at least some of the remaining pixels from the 3-D world space to a two-dimensional (2-D) display space for left and right eyes of the second party.

14. The system of claim 13, wherein the program code to compose the first set of tiles comprises program code to:

select pixels from each tile that have been transformed into the 2-D display space based on the point of view of the second party;
synthesize pixels for each tile using the selected pixels; and
compose each tile using the synthesized pixels.

15. The system of claim 8, wherein the program code is further configured to cause the one or more processors to—
receive a second set of composed tiles from a second camera array associated with the second party through the network connector;
warp pixels of the second set of composed tiles based on a late estimation of a change in a point of view of the first party; and
assemble a frame using the second set of composed tiles.

16. A non-transitory computer readable media containing instructions that, when executed by a computer system, cause the computer system to:
capture images of a first scene associated with a first party using a first camera array, the first camera array having a first plurality of cameras;
obtain information representative of a point of view of a second party;
identify a first set of tiles based on arrangement of the first camera array;
cull pixels of the captured by the first camera array, based on the point of view of the second party, and identify remaining pixels;
compose the first set of tiles of the first scene based on the remaining pixels; and
transmit, through a network connection, the first set of composed tiles to the second party.

17. The non-transitory computer readable media of claim 16, wherein the instructions to cull pixels comprise instructions to:
identify a plurality of boundary cameras for each tile of the first set of tiles; and
eliminate pixels from a tile when the point of view of the second party corresponds to a given spatial relationship to one or more of the tile's boundary cameras.

18. The non-transitory computer readable media of claim 16, wherein the instructions to cull pixels comprise instructions to:
identify a plurality of boundary cameras for each tile of the first set of tiles;
obtain information of a nearest object, relative to the first camera array, in the first scene;
identify, for at least one tile, a contracted field of view for the at least one tile's boundary cameras based on the point of view of the second party and the information of the nearest object in the first scene; and
eliminate pixels corresponding to areas outside the contracted field of view.

19. The non-transitory computer readable media of claim 17, wherein the instructions further comprise instructions to:
transform the remaining pixels from at least some of the first plurality of cameras' three-dimensional (3-D) space to a 3-D world space; and
transform at least some of the remaining pixels from the 3-D world space to a two-dimensional (2-D) display space for left and right eyes of the second party.

20. The non-transitory computer readable media of claim 19, wherein the instructions to compose the first set of tiles comprise instructions to:
select pixels from each tile that have been transformed into the 2-D display space based on the point of view of the second party;
synthesize pixels for each tile using the selected pixels; and
compose each tile using the synthesized pixels.

* * * * *

UNITED STATES PATENT AND TRADEMARK OFFICE
CERTIFICATE OF CORRECTION

PATENT NO. : 9,681,096 B1  
APPLICATION NO. : 15/275074  
DATED : June 13, 2017  
INVENTOR(S) : Ricardo J. Motta et al.

Page 1 of 1

It is certified that error appears in the above-identified patent and that said Letters Patent is hereby corrected as shown below:

In the Claims

Column 17 Line 26: Replace the phrase "cull pixels of the captured" with the phrase --cull pixels of the images captured--.

Signed and Sealed this
First Day of August, 2017

Joseph Matal
*Performing the Functions and Duties of the*
*Under Secretary of Commerce for Intellectual Property and*
*Director of the United States Patent and Trademark Office*